US012738003B2

(12) United States Patent
Jagadeesh

(10) Patent No.: US 12,738,003 B2
(45) Date of Patent: Sep. 15, 2026

(54) INFORMATION PROCESSING APPARATUS, INFORMATION PROCESSING METHOD, AND A COMPUTER-READABLE STORAGE MEDIUM STORING AN INFORMATION PROCESSING PROGRAM

(71) Applicant: Sony Semiconductor Solutions Corporation, Atsugi (JP)

(72) Inventor: Hareesh Jagadeesh, Kanagawa (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 182 days.

(21) Appl. No.: 18/685,520

(22) PCT Filed: Feb. 21, 2022

(86) PCT No.: PCT/JP2022/006813

§ 371 (c)(1),
(2) Date: Feb. 22, 2024

(87) PCT Pub. No.: WO2023/047624

PCT Pub. Date: Mar. 30, 2023

(65) Prior Publication Data

US 2025/0124682 A1 Apr. 17, 2025

(30) Foreign Application Priority Data

Sep. 21, 2021 (JP) ................................ 2021-153425

(51) Int. Cl.

*G06V 10/12* (2022.01)
*G06V 10/82* (2022.01)
*H04N 23/62* (2023.01)

(52) U.S. Cl.

CPC .............. *G06V 10/12* (2022.01); *G06V 10/82* (2022.01); *H04N 23/62* (2023.01)

(58) Field of Classification Search

CPC ......... G06V 10/12; G06V 10/82; H04N 23/62
See application file for complete search history.

(56) References Cited

U.S. PATENT DOCUMENTS 11,989,888 B2 * 5/2024 Chan ........................ G06N 3/09
12,008,754 B2 * 6/2024 Wang .................... G06T 7/0012
(Continued)

FOREIGN PATENT DOCUMENTS

JP 2018181157 A * 11/2018 ........... G06F 18/214
JP 2020-064564 A 4/2020
(Continued)

OTHER PUBLICATIONS

International Search Report and Written Opinion mailed on May 17, 2022, received for International Patent Application No. PCT/JP2022/006813, filed on Feb. 21, 2022, 9 pages including English Translation.

*Primary Examiner* — Shefali D Goradia
(74) *Attorney, Agent, or Firm* — XSENSUS LLP

(57) ABSTRACT

An information processing apparatus includes an acquisition unit that acquires a first image through imaging, a determination unit that determines whether a predetermined object is included in the first image acquired by the acquisition unit based on a model that has learned the predetermined object, and a selection unit that selects a second image from among images determined by the determination unit as including the predetermined object, and executes relearning of the model by using the selected second image.

20 Claims, 12 Drawing Sheets

(56) References Cited

U.S. PATENT DOCUMENTS

| | | | |
|---|---|---|---|
| 2019/0102656 | A1 | 4/2019 | Kwant et al. |
| 2019/0347522 | A1 | 11/2019 | Nir et al. |

FOREIGN PATENT DOCUMENTS

| | | | | |
|---|---|---|---|---|
| WO | WO-2021176899 | A1 * | 9/2021 | ............... G06T 7/70 |
| WO | WO-2022202366 | A1 * | 9/2022 | ............. G01N 21/88 |
| WO | WO-2023017611 | A1 * | 2/2023 | ............. G01N 23/04 |

* cited by examiner

121

| IMAGE ID | OBJECT | CAMERA PARAMETER | ... |
|---|---|---|---|
| ... | ... | ... | ... |
| A01 | PRESENT | B01 | ... |
| A02 | ABSENT | B02 | ... |
| A03 | PRESENT | B03 | ... |
| A04 | PRESENT | B04 | ... |
| ... | ... | ... | ... |

300
DETECTION APPARATUS
310
321
IMAGING UNIT
311
320
313
312
322
IMAGING PROCESSING UNIT
323
OUTPUT CONTROL UNIT
324
OUTPUT I/F
325
IMAGING CONTROL UNIT
331
CPU
332
DSP
333
MEMORY
334
COMMUNICATION I/F
335
IMAGE COMPRESSION UNIT
336
INPUT I/F
330

INFORMATION PROCESSING APPARATUS, INFORMATION PROCESSING METHOD, AND A COMPUTER-READABLE STORAGE MEDIUM STORING AN INFORMATION PROCESSING PROGRAM

CROSS-REFERENCE TO RELATED APPLICATIONS

This application is a national stage application, pursuant to 35 U.S.C. § 371, of International Patent Application No. PCT/JP2022/006813, filed Feb. 21, 2022, which claims priority from Japanese Patent Application No. 2021-153425, filed Sep. 21, 2021, the entire contents of each are incorporated herein by reference.

FIELD

The present disclosure relates to an information processing apparatus that selects learning data for machine learning, an information processing method, and a computer-readable storage medium storing an information processing program.

BACKGROUND

Models generated by machine learning using a deep neural network (DNN) or the like are used in many fields. For example, a model learned by DNN or the like is often used for processing of recognizing an object included in an image.

In machine learning, the accuracy of a generated model changes depending on the amount and quality of learning data used for learning. That is, to generate a highly accurate model, it is required to prepare appropriate learning data adapted to processing to be executed using the model. In addition, relearning using new learning data may be performed to improve the accuracy of the generated model or to make a specification more suitable for the purpose.

As a technology related to model relearning, a technology for proposing learning data to be used for relearning and a technology related to annotation (setting of teacher data) such as semi-automatic labeling of learning data are known.

CITATION LIST

Patent Literature

Patent Literature 1: US 2019/0347522 A
Patent Literature 2: US 2019/0102656 A

SUMMARY

Technical Problem

In relearning of a model, it is desirable to selectively prepare learning data suitable for the purpose of the model. That is, there is a possibility that the accuracy of the model does not improve by relearning with randomly selected learning data. It may take a considerable time for relearning, and the relearning may lack practicality when a large amount of learning data is prepared to improve the accuracy.

The present disclosure proposes an information processing apparatus capable of selecting learning data for efficiently performing relearning, an information processing method, and A computer-readable storage medium storing an information processing program.

Solution to Problem

In order to solve the above problems, an information processing apparatus according to an embodiment of the present disclosure includes an acquisition unit that acquires a first image through imaging, a determination unit that determines whether a predetermined object is included in the first image acquired by the acquisition unit based on a model that has learned the predetermined object, and a selection unit that selects a second image from among images determined by the determination unit as including the predetermined object, and executes relearning of the model by using the selected second image.

DESCRIPTION OF EMBODIMENTS

Hereinafter, embodiments will be described in detail with reference to the drawings. In each of the following embodiments, the same portions are denoted by the same reference signs, and repetitive description will be omitted.

The present disclosure will be described according to the following item order.

1. Embodiment
   1-1. Overview of Information Processing According to Embodiment
   1-2. Configuration of Imaging Apparatus According to Embodiment
   1-3. Procedure of Processing According to Embodiment
   1-4. Similar Example of Information Processing According to Embodiment
   1-5. Configuration of Information Processing Apparatus According to Modification
   1-6. Modification According to Embodiment
2. Other Embodiments 3. Effects of Information Processing Apparatus According to Present Disclosure
4. Hardware Configuration

1. Embodiment

1-1. Overview of Information Processing According to Embodiment

Figure 1:
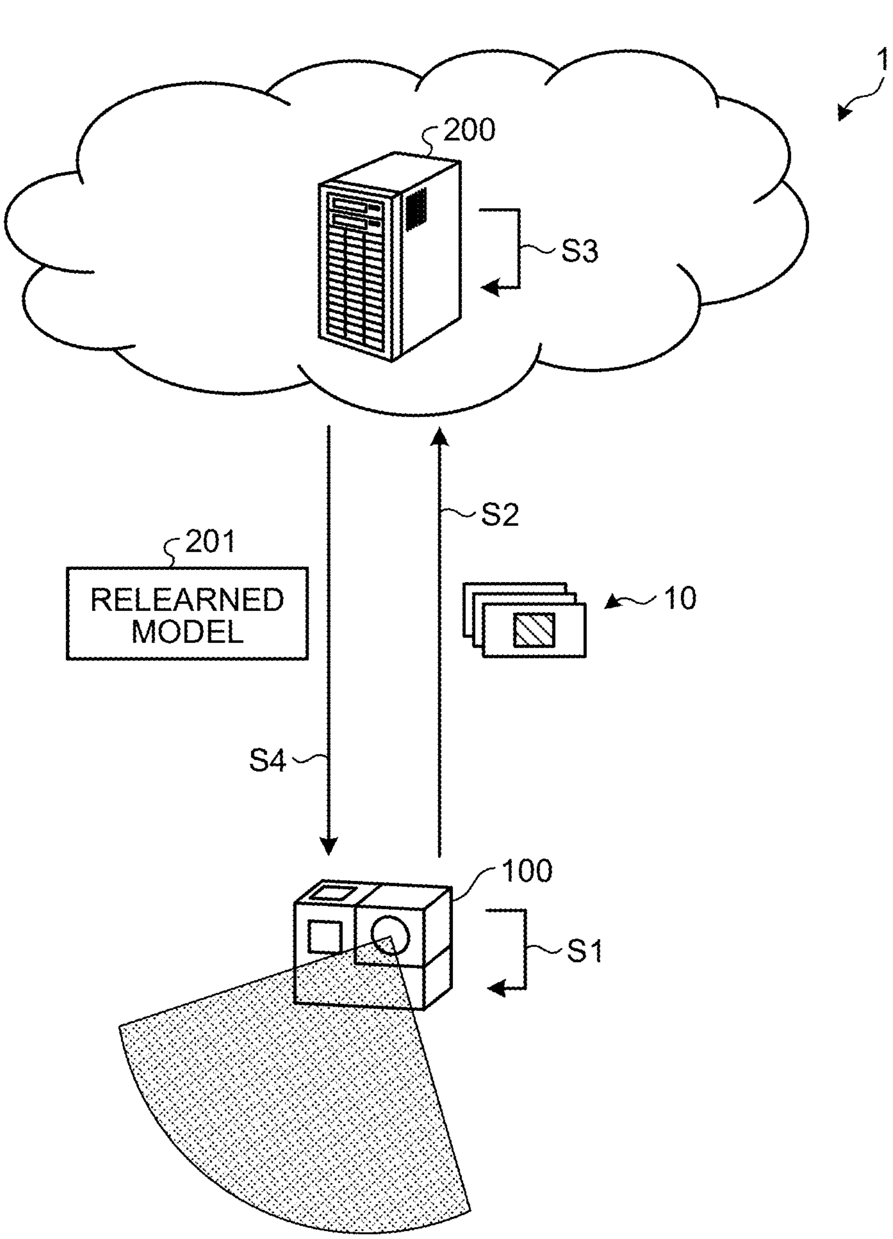
FIG. 1 is a diagram illustrating an outline of information processing with a relearning system according to an embodiment.

An example of information processing according to an embodiment of the present disclosure will be described with reference to FIG. 1. FIG. 1 is a diagram illustrating an outline of information processing with a relearning system 1 according to an embodiment. As illustrated in FIG. 1, the relearning system 1 includes an imaging apparatus 100 that is an example of an information processing apparatus according to the present disclosure, and a cloud server 200.

The imaging apparatus 100 is an information processing apparatus having an imaging function. The imaging apparatus 100 is a digital camera, a digital video camera, or the like to be installed at a specific place, for example. The imaging apparatus 100 includes a micro controller unit (MCU) or a micro processor unit (MPU), and a CMOS image sensor (CIS). The imaging apparatus 100 performs a series of information processing such as image capturing, image storage, and image transmission/reception. The imaging apparatus 100 has a pre-trained model for recognizing a predetermined object and can determine whether the predetermined object is included in a captured image. That is, the imaging apparatus 100 functions as a terminal device (edge) in the relearning system 1.

The cloud server 200 is an information processing server that generates a model through machine learning. For example, the cloud server 200 transmits and receives information to and from the imaging apparatus 100 via a communication network.

Each device in FIG. 1 conceptually illustrates a function in the relearning system 1 and may take various modes according to the embodiment. For example, the imaging apparatus 100 may include two or more devices having different functions, such as an imaging device (camera) that is specialized for imaging and an information processing terminal such as a personal computer (PC). Each device included in the relearning system 1 is not limited to the illustrated number.

As described above, the imaging apparatus 100 has a pre-trained model for recognizing a predetermined object (hereinafter, collectively referred to as an "object"). For example, the imaging apparatus 100 can continuously perform sensing within the viewing angle under low power consumption at all times, perform imaging when recognizing an object, and store an image. Alternatively, the imaging apparatus 100 may perform imaging at regular time intervals and store an image. In this case, the imaging apparatus 100 can also extract only an image including an object from among the captured images by using the model.

Since learning of such an object recognition model is normally performed before the imaging apparatus 100 is installed, it is uncertain whether an object can be accurately recognized when the imaging apparatus 100 is actually installed. Thus, there is a case where it is necessary to relearn the model included in the imaging apparatus 100 to have a more suitable model at the installation location. However, relearning with randomly selected learning data does not improve the accuracy of the model in some cases. In addition, it may take a considerable time for relearning, and the relearning may lack practicality when a large amount of learning data is prepared to improve the accuracy.

The relearning system 1 according to the embodiment solves the above problem with information processing described below. Hereinafter, information processing with the relearning system 1 according to the embodiment will be described along a flow with reference to FIG. 1.

First, the imaging apparatus 100 acquires an image by imaging at an installation location (Step S1). The imaging apparatus 100 may acquire an image captured at a timing when the object is recognized or may acquire an image randomly captured at regular time intervals. In the following description, an image obtained by imaging is referred to as a "first image" for distinction.

Subsequently, the imaging apparatus 100 determines whether an object is included in the first image by using the pre-trained model. At this time, the imaging apparatus 100 may vary the recognition accuracy, for example, according to setting by an administrator or the like. Usually, for the model related to object recognition, a threshold for adjusting the accuracy of recognizing an object can be set. For example, the recognition accuracy of the object in the model is varied by selecting any value from 0 to 1 as the threshold. In the embodiment, it is assumed that the model tends to recognize (detect) only those conforming to the feature of the object learned in advance as the threshold approaches 1. It is also assumed that the model tends to recognize those not conforming to the feature of the object learned in advance as the threshold approaches 0. For example, in the model in which the threshold value is set to "0.8", there is a high possibility that the recognized object is the "object learned in advance", but the number of recognized objects tends to decrease. In the model in which the threshold is set to "0.5", there is a low possibility that the recognized object is the "object learned in advance" (in other words, the possibility of erroneous recognition increases), but the number of recognized objects tends to increase.

The imaging apparatus 100 determines whether the object to be recognized is included in the first image by using the model in which the predetermined threshold is set as described above. Further, the imaging apparatus 100 selects an image to be used for relearning from among images determined as including an object. In the following description, an image selected for use in relearning is referred to as a "second image" for distinction. That is, the imaging apparatus 100 performs inference processing with the model on the edge device side (in this example, the imaging apparatus 100) before uploading the learning data used for relearning to the cloud server 200. Then, the imaging apparatus 100 transmits an image set 10 including only the second images selected by the inference processing as one set to the cloud server 200 (Step S2).

In this manner, in the relearning system 1, the imaging apparatus 100 transmits only the image set 10 including the object to the cloud server 200 as learning data used for relearning. Thus, the cloud server 200 does not need to randomly process a large amount of learning data. The image set 10 transmitted from the imaging apparatus 100 includes the object actually captured by the imaging apparatus 100. Specifically, unlike an object in pre-training, the image set 10 includes an object captured in consideration of environmental conditions such as a viewing angle, brightness, and a distance at an actual installation location of the imaging apparatus 100. Thus, it is estimated that the model generated by the relearning is a model in which the recognition accuracy is further improved in the actual installation location of the imaging apparatus 100 as compared with the pre-trained model.

The cloud server 200 performs relearning by using the image set 10 uploaded from the imaging apparatus 100 (Step S3). When completing the relearning, the cloud server 200 transmits a relearned model 201 that is newly generated to the imaging apparatus 100 (Step S4). The imaging apparatus 100 can further improve the recognition accuracy of the object by newly installing the relearned model 201.

The imaging apparatus 100 may perform the inference processing by setting different thresholds in the model at the time of imaging or at the time of determining whether the object is included and at the time of selecting the second image. For example, the imaging apparatus 100 may set the threshold to "0.8" at the time of imaging or at the time of determining whether the object is included, and set the threshold to "0.5" at the time of selecting the second image to perform inference.

In this case, the imaging apparatus 100 selects, as the second image, an image recognized as "(may be) including the object in the image" although the feature is slightly ambiguous as compared with an image recognized as "including the object in the image" in the setting of the threshold "0.8". By using the image set 10 selected in this manner for relearning, the cloud server 200 can newly generate a model capable of recognizing an object from a collection of pixels whose features are not clear as compared with an image at the time of pre-training.

In this manner, the imaging apparatus 100 according to the embodiment acquires the first image through imaging and determines whether the object is included in the acquired first image based on a model in which object recognition has been learned in advance. Further, the imaging apparatus 100 selects the second image from among the images determined as including the object and executes relearning of the model by using the selected second image.

Since the relearning system 1 performs relearning by using only the image including the object actually recognized by the imaging apparatus 100 in the site as described above, the relearning system 1 can generate a model with improved recognition accuracy without using a large amount of learning data. That is, the imaging apparatus 100 according to the embodiment can select learning data for efficiently performing relearning.

1-2. Configuration of Imaging Apparatus According to Embodiment

Figures 2, 3:
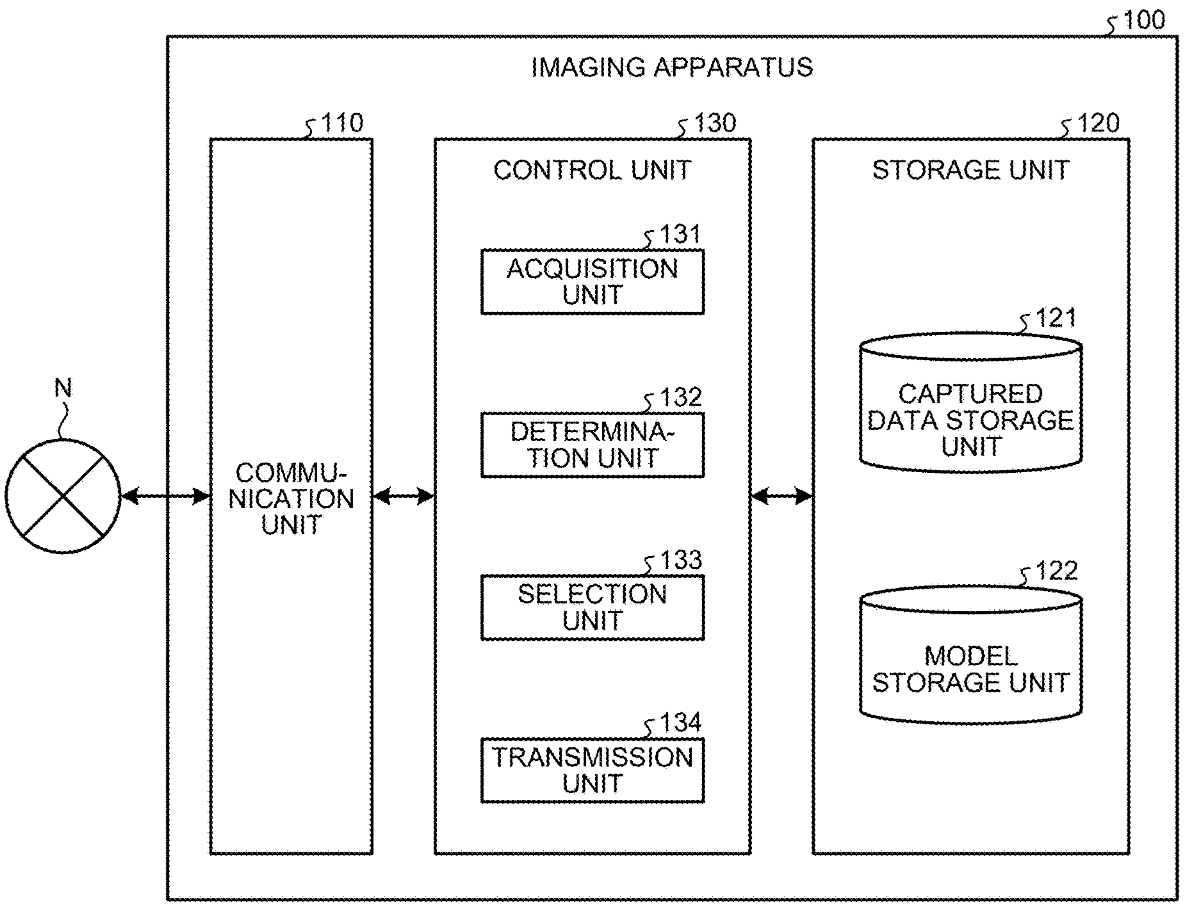
FIG. 2 is a diagram illustrating a configuration example of an imaging apparatus according to the embodiment.
FIG. 3 is a diagram illustrating an example of a captured data storage unit according to the embodiment.

Next, a configuration of the imaging apparatus 100 will be described. FIG. 2 is a diagram illustrating a configuration example of an imaging apparatus 100 according to the embodiment. Although not illustrated in FIG. 2, the imaging apparatus 100 includes various devices such as an optical mechanism and an image sensor for realizing a function as a camera.

As illustrated in FIG. 2, the imaging apparatus 100 includes a communication unit 110, a storage unit 120, and a control unit 130. The imaging apparatus 100 may include an input unit (for example, a touch display) that receives various operations from an administrator or the like who manages the imaging apparatus 100, and a display unit (for example, a liquid crystal display) for displaying various types of information.

The communication unit 110 is realized by, for example, a network interface card (NIC), a network interface controller, or the like. The communication unit 110 is connected to a network N in a wired or wireless manner and transmits and receives information to and from the imaging apparatus 100 and the like via the network N. The network N is realized by, for example, a wireless communication standard or system such as Bluetooth (registered trademark), the Internet, Wi-Fi (registered trademark), Ultra Wide Band (UWB), Low Power Wide Area (LPWA), or ELTRES (registered trademark).

The storage unit 120 is realized by, for example, a semiconductor memory device such as a random access memory (RAM) or a flash memory, or a storage device such as a hard disk or an optical disk. The storage unit 120 includes a captured data storage unit 121 and a model storage unit 122.

The captured data storage unit 121 will be described with reference to FIG. 3. FIG. 3 is a diagram illustrating an example of the captured data storage unit 121 according to the embodiment. As illustrated in FIG. 3, the captured data storage unit 121 includes items such as "IMAGE ID", "OBJECT", and "CAMERA PARAMETER". In FIG. 3, there is a case where the information stored in the captured data storage unit 121 is conceptually indicated as "A01", but actually, each piece of information to be described later is stored in the captured data storage unit 121.

"IMAGE ID" is identification information for identifying a captured image. "OBJECT" indicates a result of determination as to whether the object is included in the image with the inference processing of the pre-trained model. The "CAMERA PARAMETER" indicates a camera parameter when imaging is performed. For example, the camera parameter includes various parameters such as an exposure value at the time of imaging, white balance, and a gain (conversion parameter for adding brightness of an image). The camera parameter may include various types of information regarding the image other than the parameters at the time of imaging, such as the size (in other words, the number of pixels that can be acquired by the image sensor) and the aspect ratio of the image.

The model storage unit 122 stores a learning model used for inference processing by the imaging apparatus 100, such as object recognition processing. When acquiring a new relearned model, the imaging apparatus 100 stores the newly acquired relearned model in the model storage unit 122 in addition to the pre-trained model.

Returning to FIG. 2, the description will be continued. The control unit 130 is realized by, for example, a central processing unit (CPU), an MPU, a graphics processing unit (GPU), or the like executing a program (for example, an information processing program according to the present disclosure) stored inside the imaging apparatus 100 with a random access memory (RAM) or the like as a work area. The control unit 130 is a controller and may be realized by, for example, an integrated circuit such as an application specific integrated circuit (ASIC), a field programmable gate array (FPGA), or an MCU.

As illustrated in FIG. 2, the control unit 130 includes an acquisition unit 131, a determination unit 132, a selection unit 133, and a transmission unit 134.

The acquisition unit 131 acquires various types of information. For example, the acquisition unit 131 acquires the first image through imaging. The acquisition unit 131 also acquires the pre-trained model and the relearned model from the cloud server 200. When information is input from an administrator or the like of the imaging apparatus 100, the acquisition unit 131 acquires various types of input information.

The determination unit 132 determines whether the predetermined object is included in the first image acquired by the acquisition unit 131 based on the model that has learned the predetermined object.

For example, when the pre-trained model is a recognition model of an object, the determination unit 132 determines whether the object is included in the first image. The pre-trained model is not limited to the recognition model of an object and may be a model of any mode as long as a certain feature is extracted. For example, when the pre-trained model recognizes feature points (point cloud data) of a human skeleton and posture, the determination unit 132 can determine whether the first image includes point cloud data indicating these features, that is, whether a person having a specific posture is included in the image.

The determination unit 132 may also determine whether the object is included in the first image by varying a threshold that is a degree indicating ease of recognition of the object by the model. With this configuration, the determination unit 132 can adjust, according to the intention of the administrator, whether to determine only an image in which the object to be recognized is detected more accurately as an image including the object, or to determine an image in which the object to be recognized is detected in a slightly ambiguous manner as an image including the object.

The selection unit 133 selects the second image from among the images determined as including the object by the determination unit 132, and executes relearning of the model by using the selected second image.

For example, the selection unit 133 selects a predetermined number of second images from among the images determined as including the object, and collectively generates the image set 10. The selection unit 133 can obtain the relearned model 201 with improved recognition accuracy by causing the cloud server 200 to relearn based on the image set 10.

The selection unit 133 may also select the second image by using a second threshold different from a first threshold that is the threshold used when the determination unit 132 determines whether the object is included in the first image.

As an example, the selection unit 133 may set, as the second threshold, a value with which the degree of recognizing a predetermined object is higher than that with the first threshold (in other words, a threshold having a numerical value lower than the first threshold), and select the second image. Specifically, the selection unit 133 can select the second image by using the second threshold "0.5" with respect to the image group determined by the determination unit 132 performing the inference processing by using the first threshold "0.8". With this configuration, the selection unit 133 can cause relearning to be performed using the image set 10 including the object that has been more vaguely recognized, and thus, the relearned model 201 with an improved recognition rate can be obtained.

The transmission unit 134 transmits various types of information. For example, the transmission unit 134 transmits, to the cloud server 200, the image set 10 in which a plurality of second images selected by the selection unit 133 are collected.

1-3. Procedure of Processing According to Embodiment

Figure 4:
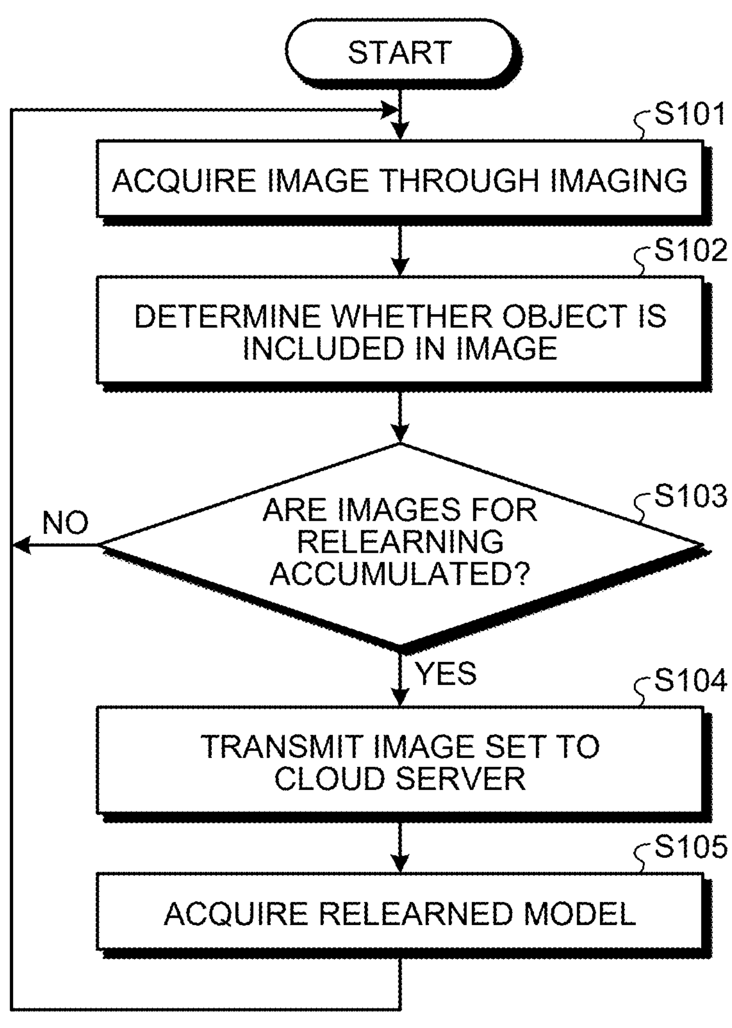
FIG. 4 is a flowchart illustrating a flow of processing according to the embodiment.

Next, a procedure of processing according to the embodiment will be described with reference to FIG. 4. FIG. 4 is a flowchart illustrating a flow of processing according to the embodiment.

As illustrated in FIG. 4, the imaging apparatus 100 acquires an image (first image) through imaging (Step S101). Subsequently, the imaging apparatus 100 determines whether the object is included in the first image (Step S102).

Thereafter, the imaging apparatus 100 determines whether images for relearning have been accumulated (Step S103). The determination timing is not limited to the case where the images are accumulated, and any timing can be set, for example, when a relearning request is received from an administrator or when a certain period of time has elapsed since the installation of the imaging apparatus 100.

When the images for relearning are not accumulated (Step S103; No), the imaging apparatus 100 continues the image acquisition processing. When the images for relearning are accumulated (Step S103; Yes), the imaging apparatus 100 generates the image set 10 through selection processing and then transmits the image set 10 to the cloud server 200 (Step S104).

Thereafter, the imaging apparatus 100 acquires a model relearned by the cloud server 200 (relearned model 201) (Step S105). The imaging apparatus 100 repeats image acquisition, determination, and selection processing using the relearned model 201 (Step S101). This enables the imaging apparatus 100 to continuously improve the accuracy of the model.

After acquiring the relearned model 201, the imaging apparatus 100 may perform verification of comparing recognition accuracy or the like between the original pre-trained model and the relearned model 201. The model evaluation method can be realized by various known methods. This enables the imaging apparatus 100 to selectively use a model with higher accuracy among the pre-trained model and the relearned model 201.

1-4. Similar Example of Information Processing According to Embodiment

The relearning system 1 according to the present disclosure can perform relearning by selecting learning data in various ways other than those illustrated in FIG. 1. A similar example of information processing according to the embodiment will be described with reference to FIG. 5 and subsequent drawings.

Figure 5:
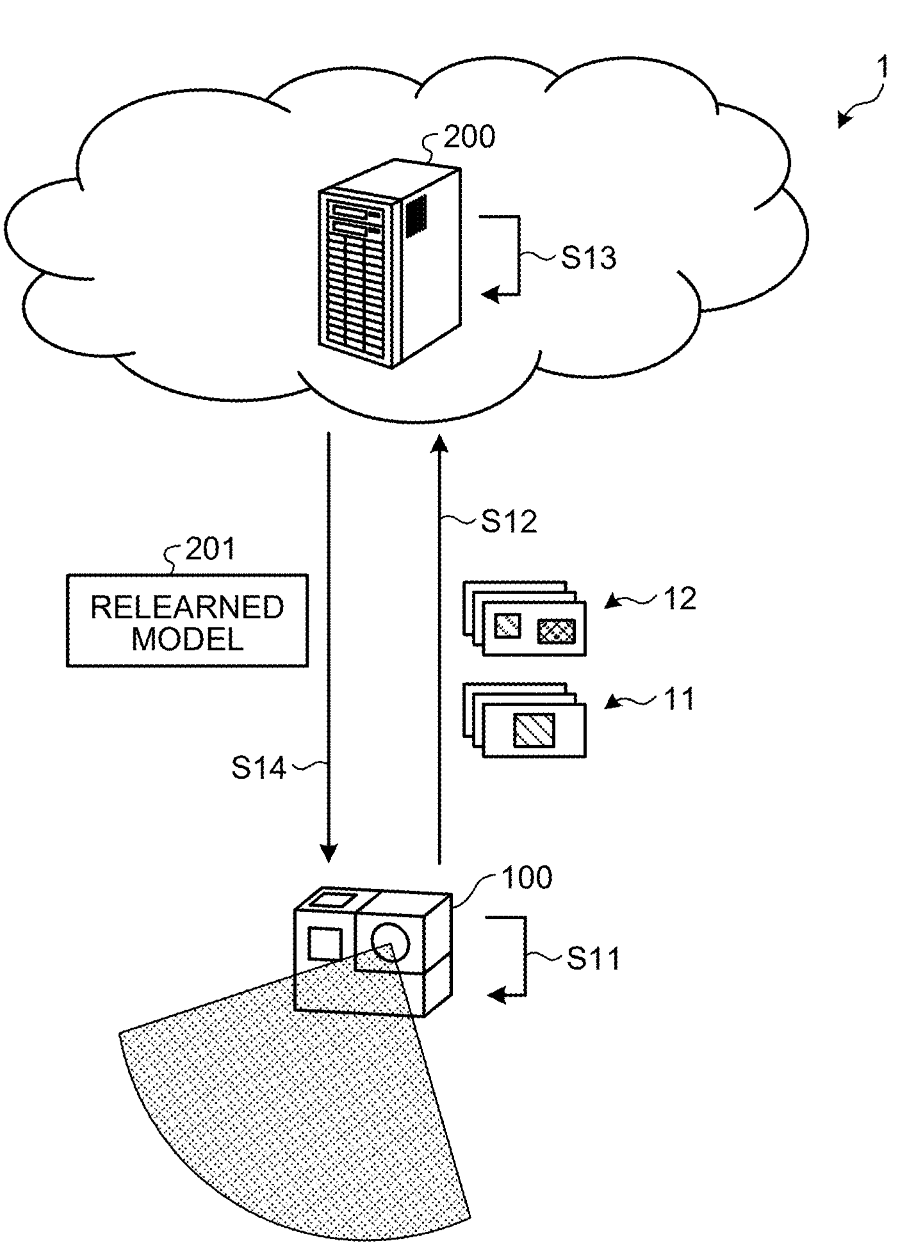
FIG. 5 is a diagram (1) for explaining a similar example of information processing according to the embodiment.

FIG. 5 is a diagram (1) for explaining a similar example of information processing according to the embodiment. In FIG. 5, an example in which a plurality of objects to be recognized are included will be described.

The imaging apparatus 100 acquires the first image through imaging as in FIG. 1 (Step S11). In the example of FIG. 5, it is assumed that the imaging apparatus 100 has a plurality of objects to be recognized. For example, it is assumed that the imaging apparatus 100 has a plurality of models, and an object to be recognized is set in each model. Alternatively, it is assumed that the imaging apparatus 100 has a model learned to recognize a plurality of different objects.

In this case, there is a possibility that a plurality of objects are included in the first image through the determination processing. That is, the imaging apparatus 100 recognizes a plurality of objects by performing inference processing on the captured first image. At this time, in the pre-trained model, there may be a case where inference is appropriately executed for a certain object (referred to as a "first object") but not for another different object (referred to as a "second object").

In this case, it is desirable that the imaging apparatus 100 generates an image set including the object in various modes to perform relearning in such a manner that the object can be accurately recognized.

For example, the imaging apparatus 100 sets a threshold for only the first object to "0.8" and generates an image set 11 subjected to the determination and selection processing. In this case, there is a high possibility that only the first object is included in the second image included in the image set 11. As another example, the imaging apparatus 100 sets a threshold for the first object to "0.8", sets a threshold for the second object to "0.5", and generates an image set 12 subjected to the determination and selection processing. In this case, there is a high possibility that the second image included in the image set 12 includes both the first object recognized relatively accurately and the second object recognized somewhat vaguely.

The imaging apparatus 100 transmits the image set 11 and the image set 12 selected with various threshold set in this manner to the cloud server 200 (Step S12). The cloud server 200 performs relearning by using the acquired image set 11 and image set 12 (Step S13). Then, the cloud server 200 transmits the generated relearned model 201 to the imaging apparatus 100 (Step S14).

That is, in the example illustrated in FIG. 5, the determination unit 132 according to the imaging apparatus 100 determines whether a plurality of different objects are included in the first image based on a model that recognizes a plurality of different objects. Then, the selection unit 133 selects the second image from among the images determined by the determination unit 132 as including a plurality of different objects, and executes relearning of the model using the selected second image.

As illustrated in FIG. 5, the determination unit 132 may determine whether a plurality of different object objects are included in the first image by varying a threshold that is a degree indicating ease of recognition of the object by the model, the threshold being able to be set to a different value for each of the plurality of different objects. This enables the imaging apparatus 100 to accurately recognize the first object and to generate various learning data such as the image set 12 in which the second object is ambiguously recognized.

Figure 6:
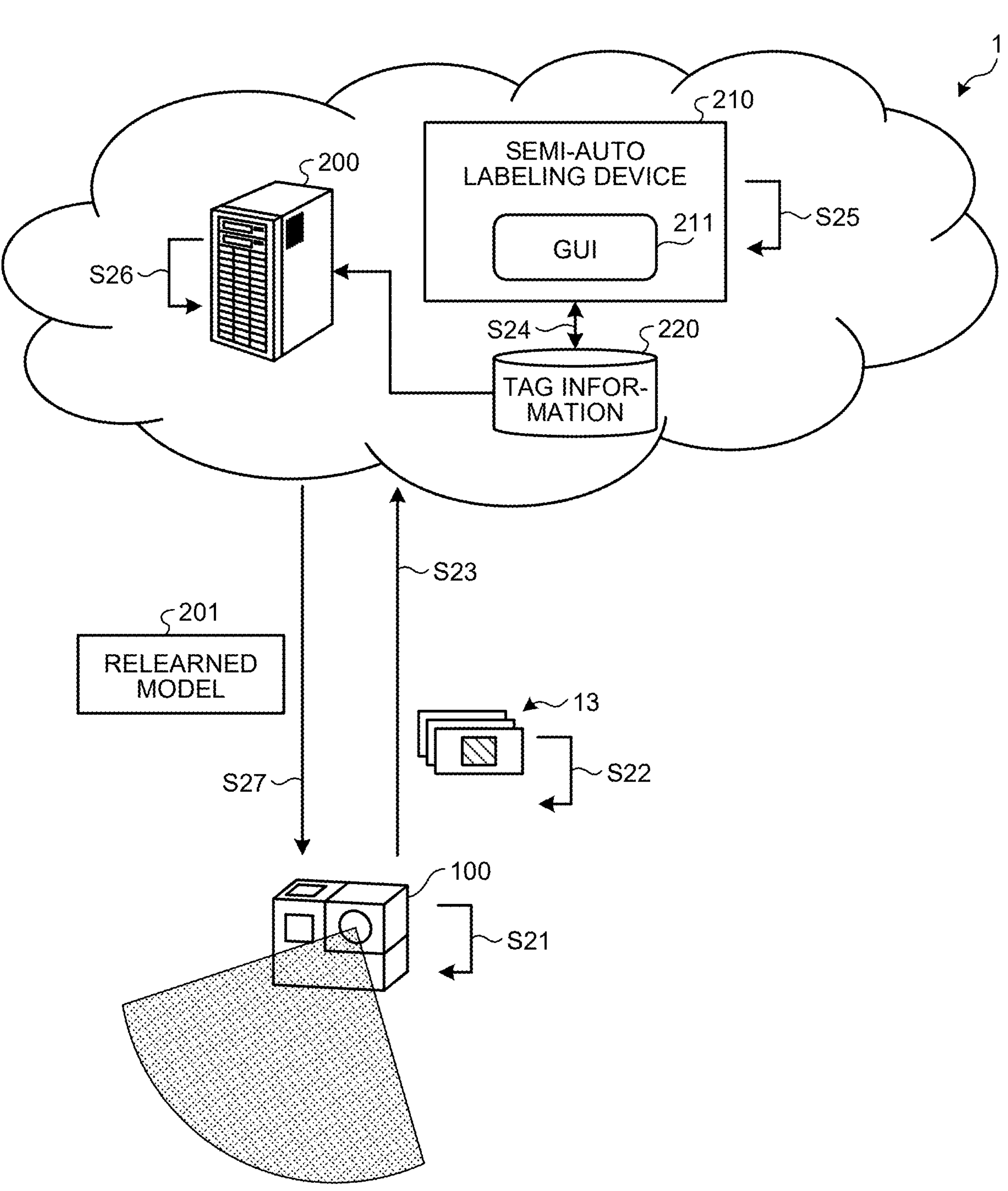
FIG. 6 is a diagram (2) for explaining a similar example of information processing according to the embodiment.

Next, another similar example will be described with reference to FIG. 6. FIG. 6 is a diagram (2) for explaining a similar example of information processing according to the embodiment. In FIG. 6, a process of assigning a label to the second image transmitted from the imaging apparatus 100 to the cloud server 200 will be described.

The imaging apparatus 100 acquires the first image through imaging as in FIG. 1 (Step S21). Subsequently, the imaging apparatus 100 generates an image set 13 in which the second images including the object are collected (Step S22). The imaging apparatus 100 transmits the image set 13 to the cloud server 200 (Step S23).

In the example of FIG. 6, the relearning system 1 includes a semi-auto labeling device 210 and a tag information database 220. The semi-auto labeling device 210 and the tag information database 220 may be incorporated in the cloud server 200, may be included in another cloud server, or may be included in the imaging apparatus 100.

The semi-auto labeling device 210 assigns a label to learning data such as the second image. That is, the semi-auto labeling device 210 is a processing unit that performs annotation in learning data.

In the example of FIG. 6, the semi-auto labeling device 210 assigns a label based on label information registered in the tag information database 220. For example, the tag information database 220 is a database in which a recognition object in the pre-trained model included in the imaging apparatus 100 is associated with a name or the like of the object as a label. For example, when the recognition object is an animal, a name or the like of the animal is registered as a label in the tag information database 220.

The second image included in the image set 13 transmitted from the imaging apparatus 100 is transmitted to the semi-auto labeling device 210. Then, the semi-auto labeling device 210 assigns a label to the second image transmitted from the imaging apparatus 100 based on the imaging apparatus 100 as a transmission source and the pre-trained model held in the imaging apparatus 100 (Step S24). For example, the semi-auto labeling device 210 assigns a label to the second image based on the name of the object included in the second image.

Here, the semi-auto labeling device 210 provides a graphical user interface (GUI) 211 to a user such as an administrator of the imaging apparatus 100. The GUI 211 displays, for example, the second image and the label attached to the second image. The user determines, via the GUI 211, whether the label given by the semi-auto labeling device 210 is correct (Step S25). When the label is incorrect, the user inputs the correct label via the GUI 211.

The cloud server 200 relearns the model using the image set 13 labeled by the semi-auto labeling device 210 (Step S26). The cloud server 200 transmits the generated relearned model 201 to the imaging apparatus 100 (Step S27).

That is, in the example illustrated in FIG. 6, the selection unit 133 assigns a label to be used for learning to the second image based on the object included in the second image and executes relearning of the model. More specifically, the selection unit 133 assigns a label to the second image by receiving designation of the label to be assigned to the object included in the second image from a user such as an administrator via the GUI 211. In the example of FIG. 6, the selection unit 133 is described as a concept including a function as the semi-auto labeling device 210.

Since the imaging apparatus 100 can semi-automatically assign a label based on the recognized object in this manner, relearning can be executed without requiring complicated annotation processing.

Figure 7:
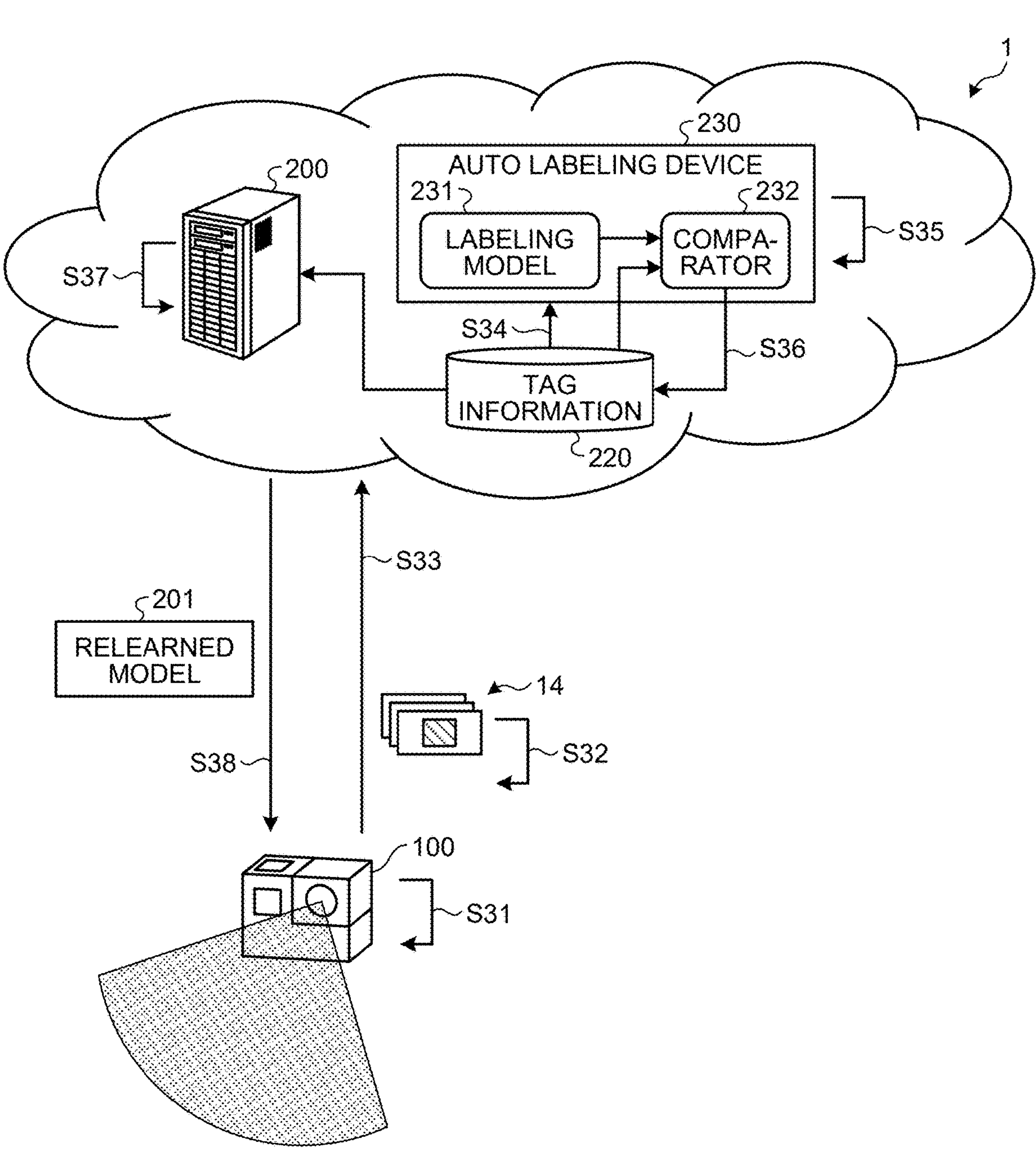
FIG. 7 is a diagram (3) for explaining a similar example of information processing according to the embodiment.

Next, a similar example of FIG. 6 will be described with reference to FIG. 7. FIG. 7 is a diagram (3) for explaining a similar example of information processing according to the embodiment. In FIG. 7, an example will be described in which, in the label applying process, not the semi-auto labeling device 210 but an auto labeling device 230 assigns a label.

The imaging apparatus 100 acquires the first image through imaging as in FIG. 6 (Step S31) and generates an image set 14 in which the second images including the object are collected (Step S32). The imaging apparatus 100 transmits the image set 14 to the cloud server 200 (Step S33).

In the example of FIG. 7, the relearning system 1 includes the auto labeling device 230 and the tag information database 220. The auto labeling device 230 includes a labeling model 231 and a comparator 232.

The auto labeling device 230 assigns a label based on the label information registered in the tag information database 220 as in FIG. 6 (Step S34). The auto labeling device 230 can also automatically assign a label to the second image by using the labeling model 231 generated by deep learning such as DNN. Then, using the comparator 232, the auto labeling device 230 compares the label assigned by using the tag information database 220 with the label assigned by using the labeling model 231, and assigns either one of the labels (Step S35). For example, using a known method of measuring accuracy in object recognition or the like, the comparator 232 assigns a label estimated to be appropriate one of the label assigned by using the tag information database 220 and the label assigned by using the labeling model 231. Depending on the learning method, the auto labeling device 230 may assign a plurality of labels to the second image instead of selecting one of the labels.

The auto labeling device 230 registers the assigned label information in the tag information database 220 and updates the database (Step S36). Thereafter, as in FIG. 6, the cloud server 200 relearns the model by using the image set 14 labeled by the auto labeling device 230 (Step S37). The cloud server 200 transmits the generated relearned model 201 to the imaging apparatus 100 (Step S38).

That is, in the example illustrated in FIG. 7, the selection unit 133 assigns a label to be used for learning to the second image based on the object included in the second image and executes relearning of the model. More specifically, the selection unit 133 assigns a label to the second image by using the labeling model 231 for determining a label to be assigned to the object included in the second image. In the example of FIG. 7, the selection unit 133 is described as a concept including a function as the auto labeling device 230.

In this manner, the imaging apparatus 100 can automatically assign a label by using the labeling model 231 relearned by DNN or the like without manual intervention. This enables the imaging apparatus 100 to improve the processing speed and further improve the relearning efficiency.

Figure 8:
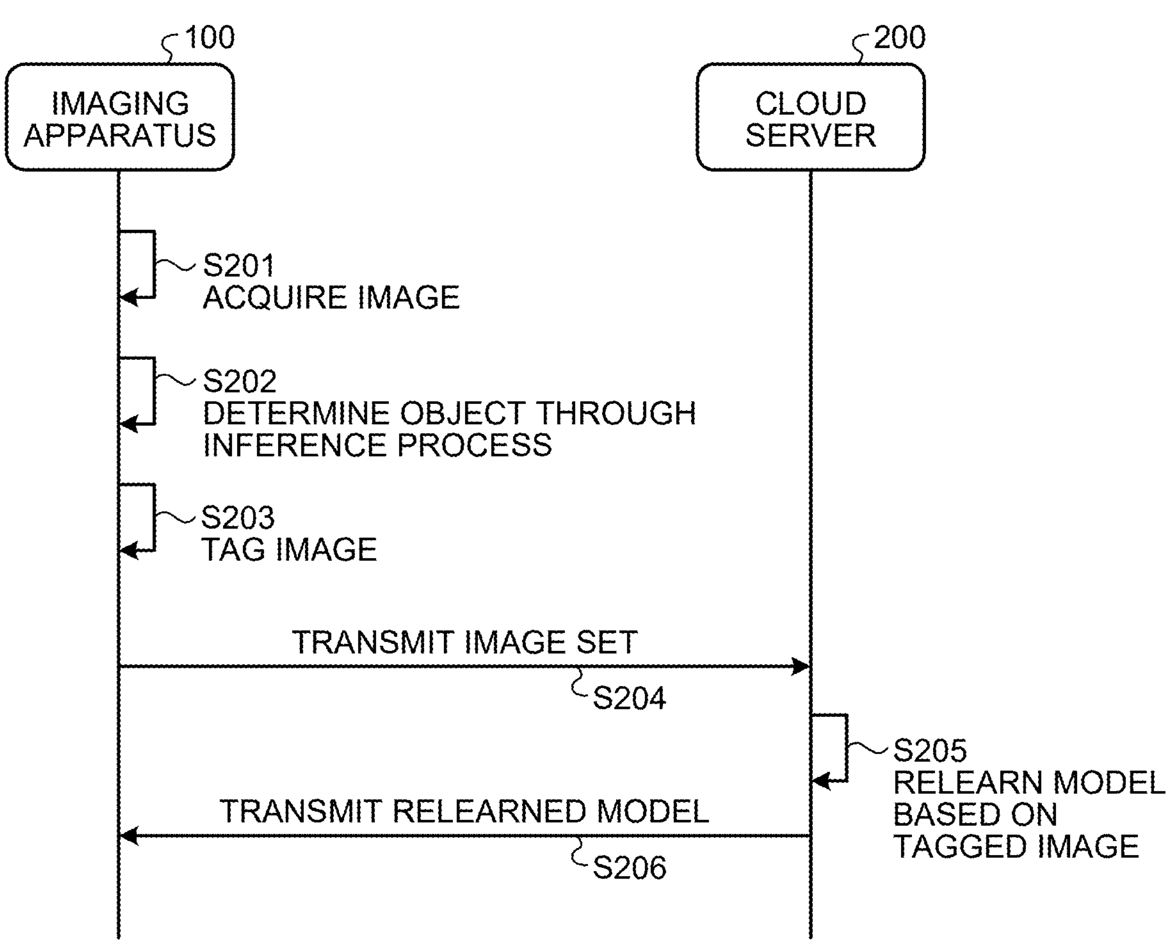
FIG. 8 is a sequence diagram illustrating a flow of a similar example of information processing according to the embodiment.

A procedure of the processing illustrated in FIGS. 6 and 7 will be described with reference to FIG. 8. FIG. 8 is a sequence diagram illustrating a flow of a similar example of information processing according to the embodiment.

As illustrated in FIG. 8, the imaging apparatus 100 acquires an image (first image) through imaging (Step S201). Subsequently, the imaging apparatus 100 determines whether the object is included in the first image with inference (Step S202).

Thereafter, the imaging apparatus 100 performs tagging (labeling) on the image by using the semi-auto labeling device 210 or the auto labeling device 230 (Step S203). Thereafter, the imaging apparatus 100 transmits an image set to the cloud server 200 (Step S204). As illustrated in FIGS. 6 and 7, the imaging apparatus 100 may perform the tagging processing after uploading the image to the cloud side.

The cloud server 200 relearns the model based on the tagged image (Step S205). Then, the cloud server 200 transmits the relearned model to the imaging apparatus 100 (Step S206).

Figure 9:
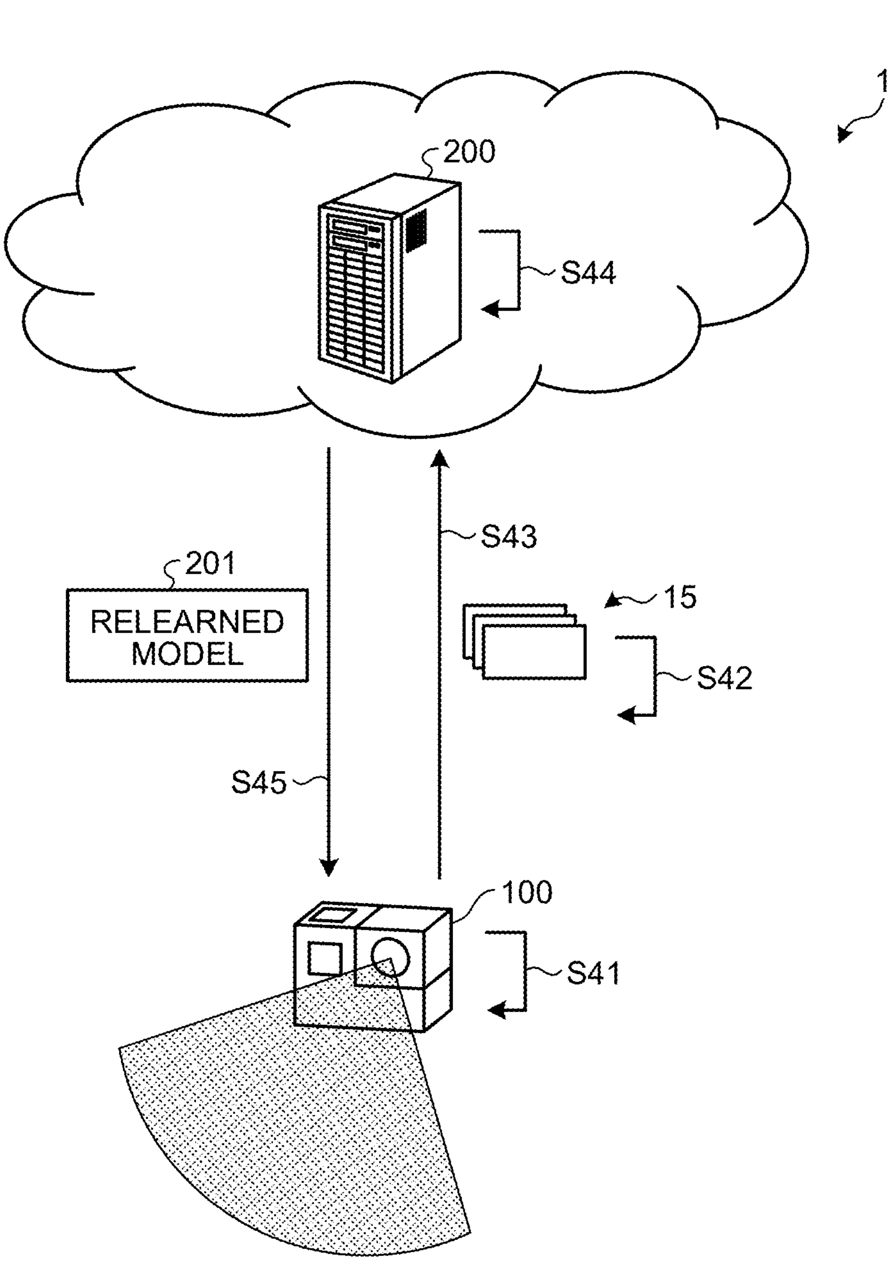
FIG. 9 is a diagram (4) for explaining a similar example of information processing according to the embodiment.

Next, a further similar example will be described with reference to FIG. 9. FIG. 9 is a diagram (4) for explaining a similar example of information processing according to the embodiment. In FIG. 9, processing in which the imaging apparatus 100 selects the second image based on a camera parameter will be described.

As described above, the imaging apparatus 100 selects the second image in order to perform relearning for accurately recognizing the object at the installation location. In this regard, the imaging apparatus 100 can obtain a robust model more suitable for the installation environment or capable of recognizing the object with high accuracy under any environment by designating values or combinations of various camera parameters (exposure value, white balance, gain, and the like) and selecting and relearning the second image in a state simulating various environments.

That is, the imaging apparatus 100 improves the accuracy of relearning by preparing the second image in which the camera parameters are variously changed in such a manner that the object object can be recognized under various environments. The imaging apparatus 100 may obtain the second image by performing imaging by designating various camera parameters, or may newly generate an image obtained by capturing an object through simulation in which the camera parameters are variably changed and acquire the image. This process will be described along the flow with reference to FIG. 9.

The imaging apparatus 100 acquires the first image through imaging as in FIG. 7 (Step S41). At this time, the imaging apparatus 100 may perform imaging by designating various camera parameters, or may acquire a newly generated first image by designating various camera parameters for the acquired first image. Then, the imaging apparatus 100 generates an image set 15 of the second images in which the specific camera parameters are designated (Step S42). The imaging apparatus 100 transmits the image set 15 to the cloud server 200 (Step S43).

The cloud server 200 relearns the model by using the acquired image set 15 (Step S44). The cloud server 200 transmits the generated relearned model 201 to the imaging apparatus 100 (Step S45).

That is, in the example of FIG. 9, the selection unit 133 selects, as the second image, a plurality of images for which the camera parameters of the images have been designated among the images determined as including the object by the determination unit 132. Specifically, the selection unit 133 selects, as the second image, an image in which at least one parameter of the exposure value, the white balance, and the gain is designated as the camera parameter.

In this manner, the imaging apparatus 100 can cause relearning to be performed by using an image as if an object has been imaged with various brightness and weather, which is similar to imaging of an object under various environments. This enables the imaging apparatus 100 to obtain a robust model that can recognize an object even under a more severe situation.

In the example of FIG. 9, the second image in which the size and aspect ratio of the image are designated may be used for relearning in addition to the camera parameters related to imaging such as the exposure value, the white balance, and the gain.

For example, the selection unit 133 may select, as the second image, a plurality of images in which the size or aspect ratio of the image is designated among the images determined as including the object by the determination unit 132. The size of the image is, in other words, the number of pixels included in the image. For example, the selection unit 133 can designate the size of the image by trimming the image by designating a parameter called crop.

Since various different environments can be imitated by changing the size and aspect ratio of the image in this manner, the imaging apparatus 100 can execute appropriate relearning according to the installation location by using these images as learning data.

Figure 10:
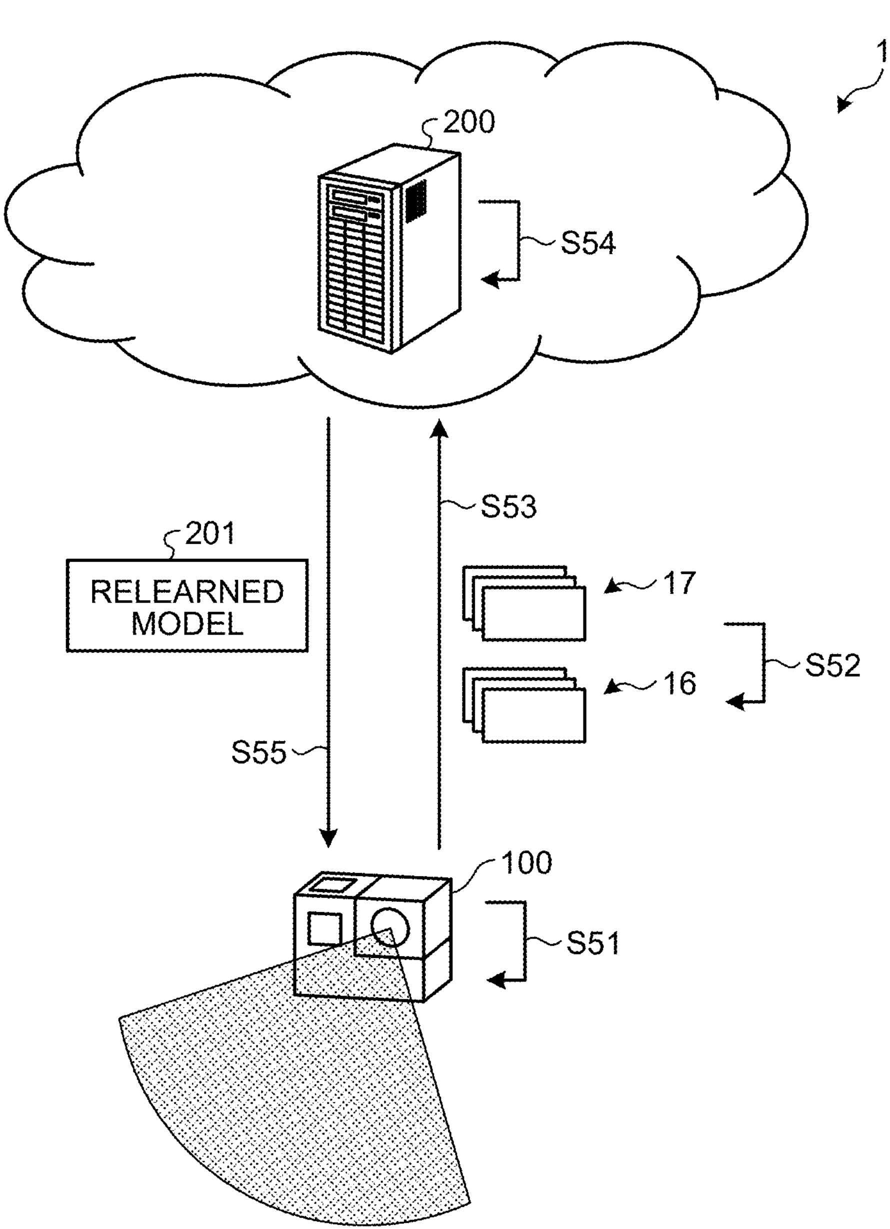
FIG. 10 is a diagram (5) for explaining a similar example of information processing according to the embodiment.

Next, a further similar example will be described with reference to FIG. 10. FIG. 10 is a diagram (5) for explaining a similar example of information processing according to the embodiment. In FIG. 10, processing in which the imaging apparatus 100 selects the second image based on certain set conditions (hereinafter, collectively referred to as a "scene") such as camera parameters and image size will be described.

As described above, the imaging apparatus 100 selects the second image in order to perform relearning for accurately recognizing the object at the installation location. In this regard, the imaging apparatus 100 may adopt a method of performing relearning based on an image set obtained by collecting only certain specific scenes, in addition to using the second images having different parameters described in FIG. 9 as learning data. For example, the imaging apparatus 100 has a list of scenes including specific parameters and designates a certain scene. Then, the imaging apparatus 100 captures a prescribed number (for example, 30 images) of images according to the designated scene to generate an image set. The setting of the scene may be manually performed, or may be automatically made by using a program or the like that automatically varies parameters. The scene may include date and time and the like. For example, the imaging apparatus 100 may use a series of image sets captured every day at a specific time for relearning. This process will be described along the flow with reference to FIG. 10.

The imaging apparatus 100 acquires the first image through imaging as in FIG. 9 (Step S51). At this time, the imaging apparatus 100 repeats imaging in a specific scene in which the parameter is designated. This causes the imaging apparatus 100 to generate an image set 16 that is a set of a series of second images having a common scene, an image set 17 in which another scene is set, and the like (Step S52). The imaging apparatus 100 transmits the image set 16 and the image set 17 to the cloud server 200 (Step S53).

The cloud server 200 relearns the model by using the acquired image set 16 and image set 17 (Step S54). The cloud server 200 transmits the generated relearned model 201 to the imaging apparatus 100 (Step S55).

That is, in the example of FIG. 10, the acquisition unit 131 acquires a predetermined number of a plurality of images in which at least one of the camera parameters at the time of photographing, the size of the image, and the aspect ratio is substantially the same (that is, a specific scene is designated). The selection unit 133 selects the plurality of images acquired by the acquisition unit 131 as the second images.

In this manner, the imaging apparatus 100 can relearn the model with improved recognition accuracy in a specific scene by learning with the second images captured in the specific scene. The process from imaging to relearning can be automatically executed without manual collection by accepting scene settings from an administrator via a network or by causing the cloud server 200 to automatically make settings in advance, for example. This enables the administrator to continuously advance relearning of the installed imaging apparatus 100 without newly inputting information or the like.

1-5. Configuration of Information Processing Apparatus According to Modification In the above embodiment, it has been described that the information processing apparatus according to the present disclosure is the imaging apparatus 100 and has the configuration illustrated in FIG. 2. Here, the information processing apparatus according to the present disclosure may be configured as a so-called AI image sensor in which an automatic recognition model is incorporated in an image sensor, and inference processing is performed using the model, which enables both object detection and imaging.

Figure 11:
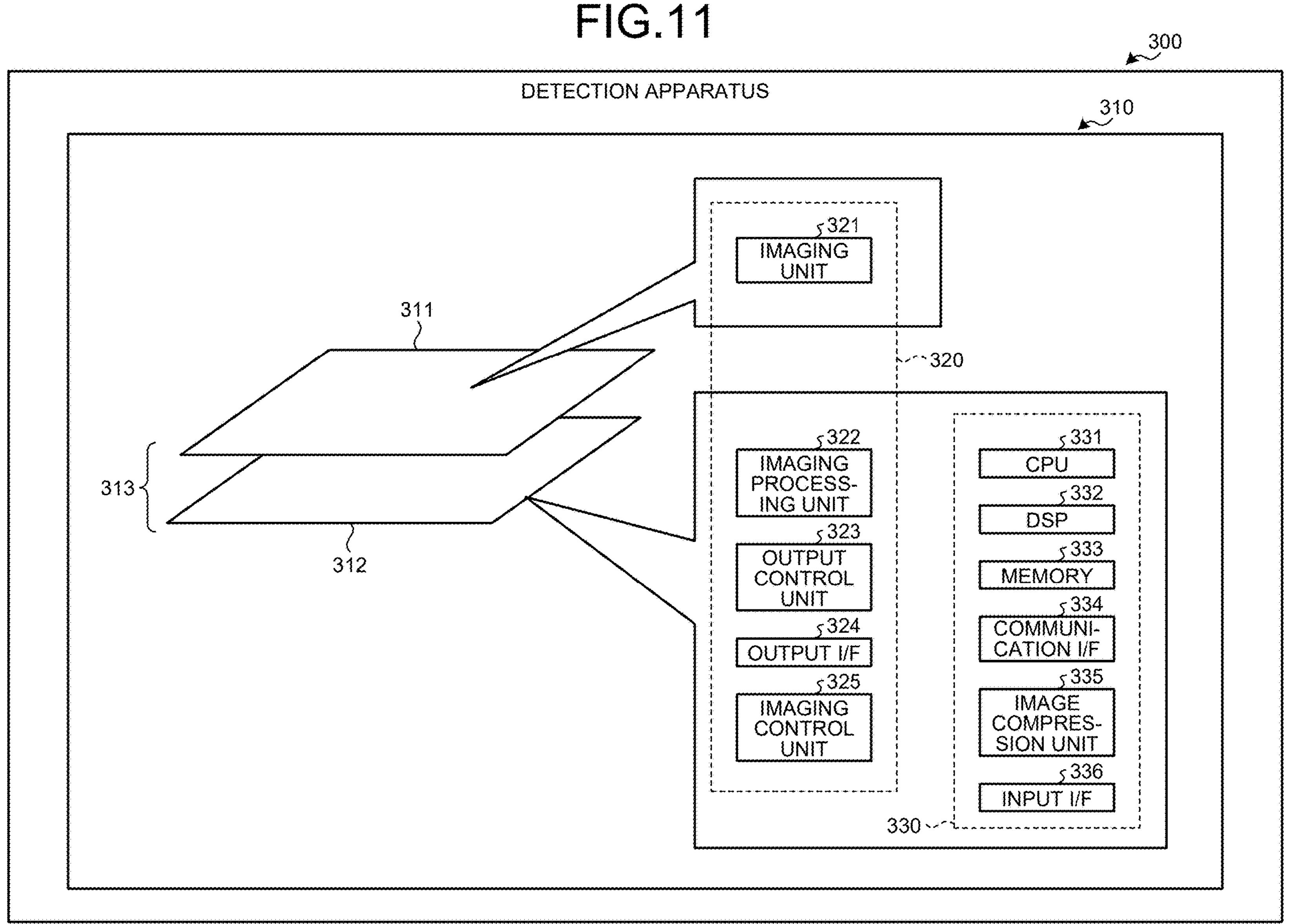
FIG. 11 is a diagram illustrating a configuration example of an information processing apparatus according to a modification.

This point will be described with reference to FIG. 11. FIG. 11 is a diagram illustrating a configuration example of an information processing apparatus according to a modification. In FIG. 11, a detection apparatus 300 is illustrated as an example of the information processing apparatus according to the modification.

As illustrated in FIG. 11, the detection apparatus 300 includes an image sensor 310. Although not illustrated in FIG. 11, the detection apparatus 300 includes an optical system for realizing a function as a digital camera and a communication system for communicating with the cloud server 200.

The image sensor 310 is, for example, a complementary metal oxide semiconductor (CMOS) image sensor including a chip, and it receives incident light from an optical system, performs photoelectric conversion, and outputs image data corresponding to the incident light.

The image sensor 310 has a configuration in which a pixel chip 311 and a logic chip 312 are integrated via a connection unit 313. The image sensor 310 also includes an image processing block 320 and a signal processing block 330.

The pixel chip 311 includes an imaging unit 321. The imaging unit 321 includes a plurality of pixels arranged in two dimensions. The imaging unit 321 is driven by an imaging processing unit 322 and captures an image.

Under the control of an imaging control unit 325, the imaging processing unit 322 performs imaging processing related to capturing of an image in the imaging unit 321, such as driving of the imaging unit 321, analog to digital (AD) conversion of an analog image signal output from the imaging unit 321, and imaging signal processing.

The captured image output from the imaging processing unit 322 is supplied to an output control unit 323 and supplied to an image compressing unit 335. The imaging processing unit 322 passes the captured image to an output I/F 324.

The output control unit 323 performs output control of selectively outputting the captured image from the imaging processing unit 322 and the signal processing result from the signal processing block 330 from the output I/F 324 to the outside (in the embodiment, a terminal apparatus 400 or the imaging apparatus 100). That is, the output control unit 323 performs control to selectively output at least one of behavior data indicating the behavior of the detected object and the image to the outside.

Specifically, the output control unit 323 selects the captured image from the imaging processing unit 322 or the signal processing result from the signal processing block 330 and supplies the selected one to the output I/F 324.

For example, when the imaging apparatus 100 requests both the image data and the behavior data, the output I/F 324 can output both the image data and the behavior data. Alternatively, when the imaging apparatus 100 requests only the behavior data, the output I/F 324 can output only the behavior data. That is, when the captured image itself is not required in the secondary analysis, the output I/F 324 can output only the signal processing result (behavior data), and thus, the amount of data to be output to the outside can be reduced.

As illustrated in FIG. 11, the signal processing block 330 includes a CPU 331, a DSP 332, a memory 333, a communication I/F 334, an image compressing unit 335, and an input I/F 336.

For example, the CPU 331 and the DSP 332 recognize an object from an image included in the image compressing unit 335 by using a pre-trained model incorporated in the memory 333 via the communication I/F 334 or the input I/F 336. The CPU 331 and the DSP 332 also acquire behavior data indicating the behavior of the recognized object. In other words, the signal processing block 330 detects the behavior of the object included in the image by using the pre-trained model for recognizing the object in cooperation of the functional units.

The above configuration enables the detection apparatus 300 according to the embodiment to selectively output the image data obtained by the image processing block 320 and the behavior data obtained by the signal processing block 330 to the outside.

The detection apparatus 300 may include various sensors in addition to the configuration illustrated in FIG. 11. For example, the detection apparatus 300 may include a ToF sensor that is a depth sensor that measures a distance to an object located in space. This enables the detection apparatus 300 to acquire not only two-dimensional point cloud data indicated on an image but also three-dimensional point cloud data to which the height information is added as the behavior data.

The configuration illustrated in FIG. 11 corresponds to the configuration of the imaging apparatus 100 illustrated in FIG. 2. For example, the CPU 331 corresponds to the control unit 130. That is, the information processing apparatus according to the present disclosure is not limited to the imaging apparatus 100 illustrated in FIG. 2 but may be configured as a device having an information processing function such as an AI image sensor.

1-6. Modification According to Embodiment

The above embodiment may involve various different modifications. For example, FIG. 1 and the like illustrate an example in which relearning is performed based on an image captured by the imaging apparatus 100. However, in an actual site, a case where a plurality of imaging apparatuses 100 are installed to capture images of a certain object is also assumed. In this case, the imaging apparatuses 100 can generate a more accurate model by imaging an object from various different angles and relearning the model with a plurality of obtained images. This point will be described with reference to FIG. 12.

Figure 12:
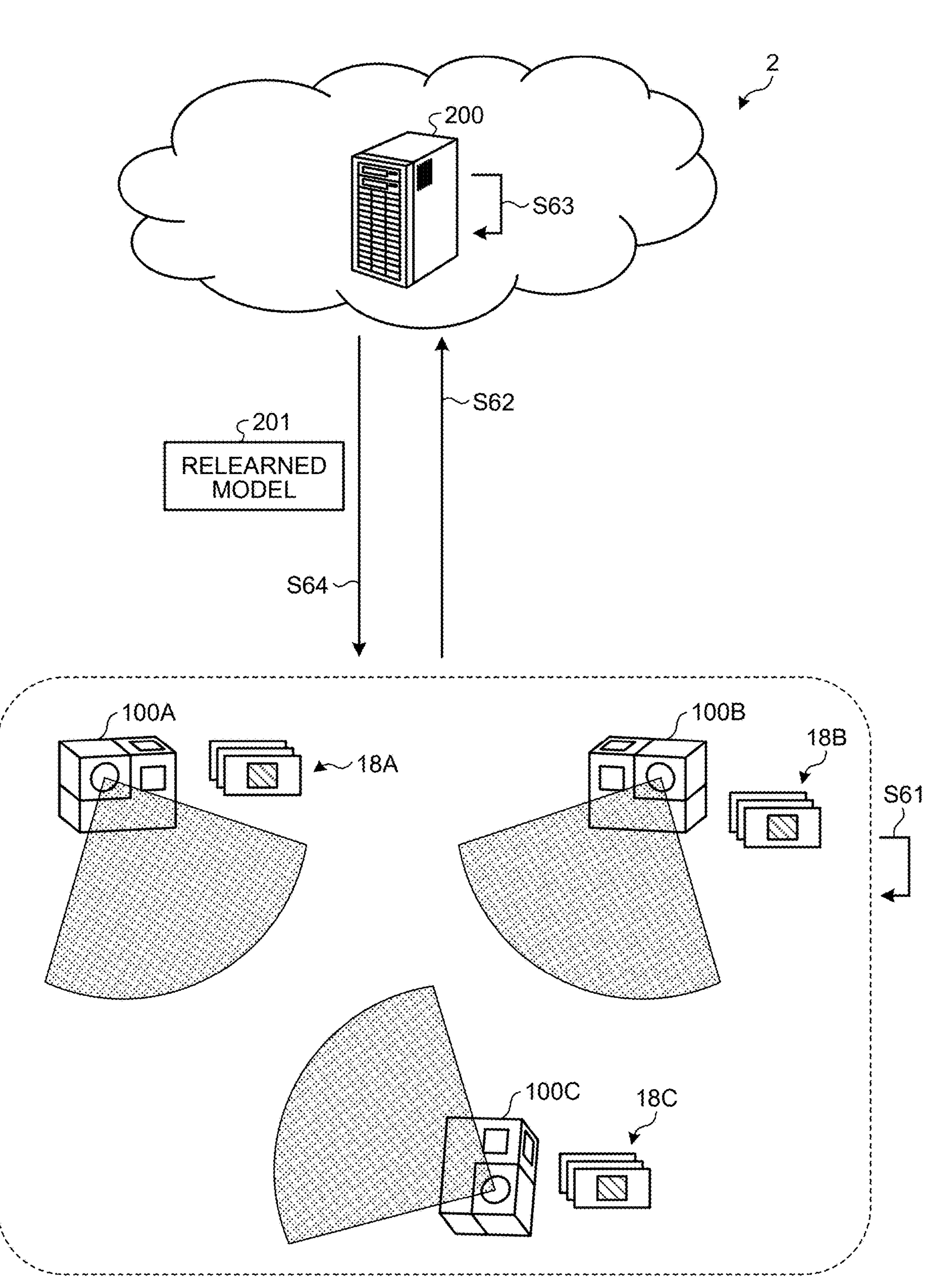
FIG. 12 is a diagram for explaining information processing according to the modification.

FIG. 12 is a diagram for explaining information processing according to a modification. The relearning system 2 illustrated in FIG. 12 includes a cloud server 200 and a plurality of imaging apparatuses such as an imaging apparatus 100A, an imaging apparatus 100B, and an imaging apparatus 100C. The imaging apparatus 100A, the imaging apparatus 100B, and the imaging apparatus 100C are the same as the imaging apparatus 100 according to the embodiment in terms of configuration and function. Thus, when there is no need to distinguish the imaging apparatus 100A, the imaging apparatus 100B, and the imaging apparatus 100C, they are collectively referred to as the imaging apparatus 100.

In the example illustrated in FIG. 12, the imaging apparatus 100A, the imaging apparatus 100B, and the imaging apparatus 100C acquire the first image by imaging an object to be a certain recognition object (Step S61). Then, for example, the imaging apparatus 100A generates an image set 18A in which second images including the object are collected from among the first images. The imaging apparatus 100B generates an image set 18B in which second images including the object are collected from among the first images. The imaging apparatus 100C generates an image set 18C in which second images including the object are collected from among the first images.

Then, each of the imaging apparatus 100A, the imaging apparatus 100B, and the imaging apparatus 100C or any one imaging apparatus 100 transmits the image set 18A, the image set 18B, and the image set 18C to the cloud server 200 (Step S62).

The cloud server 200 relearns the model using the acquired image set 18A, image set 18B, and image set 18C (Step S63). The cloud server 200 transmits the relearned model 201 to each of the imaging apparatus 100A, the imaging apparatus 100B, and the imaging apparatus 100C (Step S64).

In this manner, the imaging apparatus 100 according to the modification acquires images captured by a plurality of imaging devices (cameras) installed at different positions as the first image. Further, the imaging apparatus 100 determines whether an object is included in images captured by a plurality of imaging devices installed at different positions based on the model, selects a plurality of images including images captured by at least two different imaging devices among the determined images as the second image, and executes relearning of the model using the selected second images.

That is, the imaging apparatus 100 according to the modification selects, as the second image, an image in which an object object is captured from different angles by imaging devices (in the example of FIG. 12, at least two of the imaging apparatus 100A, the imaging apparatus 100B, and the imaging apparatus 100C) at different installation locations. This causes the imaging apparatus 100 to use objects captured at various distances and appearances for relearning even for the same object, and thus, a model with further improved recognition accuracy can be generated.

2. Other Embodiments

The processing according to each embodiment described above may be performed in various different modes other than each embodiment described above.

In the embodiments described above, an example in which the cloud server 200 performs learning process has been described. However, when the imaging apparatus 100 includes a sufficient GPU or the like, the imaging apparatus 100 may perform learning processing.

In the embodiments described above, a model for performing object recognition of an object or the like has been described as the pre-trained model. However, the model is not limited to the object recognition, and the information processing according to the present disclosure can be applied to any model as long as the model is a model generated by using machine learning such as DNN.

For each processing described in the embodiments described above, the whole or part of the processing described as being performed automatically can be performed manually, or the whole or part of the processing described as being performed manually can be performed automatically by a known method. In addition, the processing procedure, specific name, and information including various data and parameters illustrated in the description and the drawings can be freely changed unless otherwise specified. For example, the various types of information illustrated in each drawing are not limited to the illustrated information.

Each component of each apparatus illustrated in the drawings is functionally conceptual, and is not necessarily physically configured as illustrated in the drawings. That is, a specific form of distribution and integration of each apparatus is not limited to the illustrated form, and all or a part thereof can be functionally or physically distributed and integrated in any unit according to various loads, usage conditions, and the like. For example, the determination unit 132 and the selection unit 133 may be integrated.

The embodiments and modifications described above can be appropriately combined within a range in which the processing contents do not contradict each other.

The effects described in the present specification are merely examples and are not restrictive of the disclosure herein, and other effects may be achieved.

3. Effects of Information Processing Apparatus According to Present Disclosure As described above, the information processing apparatus (the imaging apparatus 100 in an embodiment) according to the present disclosure includes the acquisition unit (the acquisition unit 131 in an embodiment), the determination unit (the determination unit 132 in an embodiment), and the selection unit (the selection unit 133 in an embodiment). The acquisition unit acquires the first image through imaging. The determination unit determines whether a predetermined object is included in the first image acquired by the acquisition unit based on the model that has learned the predetermined object. The selection unit selects the second image from among the images determined as including the predetermined object by the determination unit, and executes relearning of the model by using the selected second image.

Since the information processing apparatus according to the preset disclosure performs relearning by using only the image including the object actually recognized in a site as described above, the information processing apparatus can generate a model with improved recognition accuracy without using a large amount of learning data. That is, the imaging apparatus 100 according to the embodiment can select learning data for efficiently performing relearning.

The determination unit determines whether a predetermined object is included in the first image by varying a threshold that is a degree indicating ease of recognition of the predetermined object by the model. The selection unit selects the second image by using a second threshold different from the first threshold that is the threshold used when the determination unit determines whether the predetermined object is included in the first image.

In this manner, the information processing apparatus can select an object according to the accuracy in recognizing the object and perform relearning by using the second image selected by setting a threshold. This enables the information processing apparatus to perform relearning according to the intention of the administrator or the like.

The selection unit selects the second image by setting, as the second threshold, a value with which the degree of recognition of the predetermined object is increased as compared with the first threshold.

In this manner, the information processing apparatus can select an object according to the accuracy in recognizing the object and perform relearning by using the second image selected by setting a threshold. This enables the information processing apparatus to perform relearning according to the intention of the administrator or the like.

The determination unit determines whether a plurality of different objects are included in the first image based on a model that recognizes a plurality of different objects as predetermined objects. The selection unit selects the second image from among the images determined as including a plurality of different objects by the determination unit, and executes relearning of the model by using the selected second image.

In this manner, the information processing apparatus can use an image including various modes such as an image including a plurality of objects as the learning data.

The determination unit determines whether a plurality of different objects are included in the first image by varying a threshold that is a degree indicating ease of recognition of a predetermined object by the model, the threshold being able to be set to a different value for each of a plurality of different objects.

In this manner, the information processing apparatus can perform adjustment in relearning such as causing more strict recognition or widely recognizing an object by using an image including various aspects as learning data.

The selection unit assigns a label used for learning to the second image based on a predetermined object included in the second image and executes relearning of the model.

In this manner, the information processing apparatus can efficiently perform annotation processing by labeling an image including an object.

The selection unit assigns a label to the second image by accepting designation of the label to be assigned to a predetermined object included in the second image via a user interface.

In this manner, the information processing apparatus can perform more accurate label assignment by receiving a label from the user.

The selection unit assigns a label to the second image by using a label assignment model for determining a label to be assigned to a predetermined object included in the second image.

In this manner, the information processing apparatus can speed up annotation processing by automatically assigning a label.

The selection unit selects, as the second image, a plurality of images for which the camera parameters of the images have been designated among the images determined as including a predetermined object by the determination unit.

In this manner, the information processing apparatus can cause relearning of a robust model not affected by the environment by using the second image imitating various environments as the learning data.

The selection unit selects, as the second image, an image in which at least one parameter of the exposure value, the white balance, and the gain is designated as the camera parameter.

In this manner, the information processing apparatus can cause relearning of a robust model not affected by the environment by using the second image imitating various environments as the learning data.

The selection unit selects, as the second image, a plurality of images in which the size or aspect ratio of the image is designated among the images determined as including a predetermined object by the determination unit.

In this manner, by using images of various sizes and shapes as learning data, the information processing apparatus can cause relearning of a robust model without depending on the size of the image or the like.

The acquisition unit acquires a predetermined number of a plurality of images having substantially any one of the same camera parameter, image size, or aspect ratio at the time of imaging. The selection unit selects the plurality of images acquired by the acquisition unit as the second images.

In this manner, the information processing apparatus can generate a model with improved recognition accuracy or speed up the learning processing itself by designating and learning a specific scene.

The acquisition unit acquires images captured by a plurality of imaging devices installed at different positions as the first images. The determination unit determines, based on the model, whether a predetermined object is included in the images captured by the plurality of imaging devices installed at different positions. The selection unit selects, as the second image, a plurality of images including images captured by at least two different imaging devices from among the images determined by the determination unit as including a predetermined object, and executes relearning of the model by using the selected second image.

In this manner, the information processing apparatus can relearn the model in which the recognition accuracy is dramatically improved by using images in which the object is captured from a plurality of angles as the learning data.

4. Hardware Configuration

Figure 13:
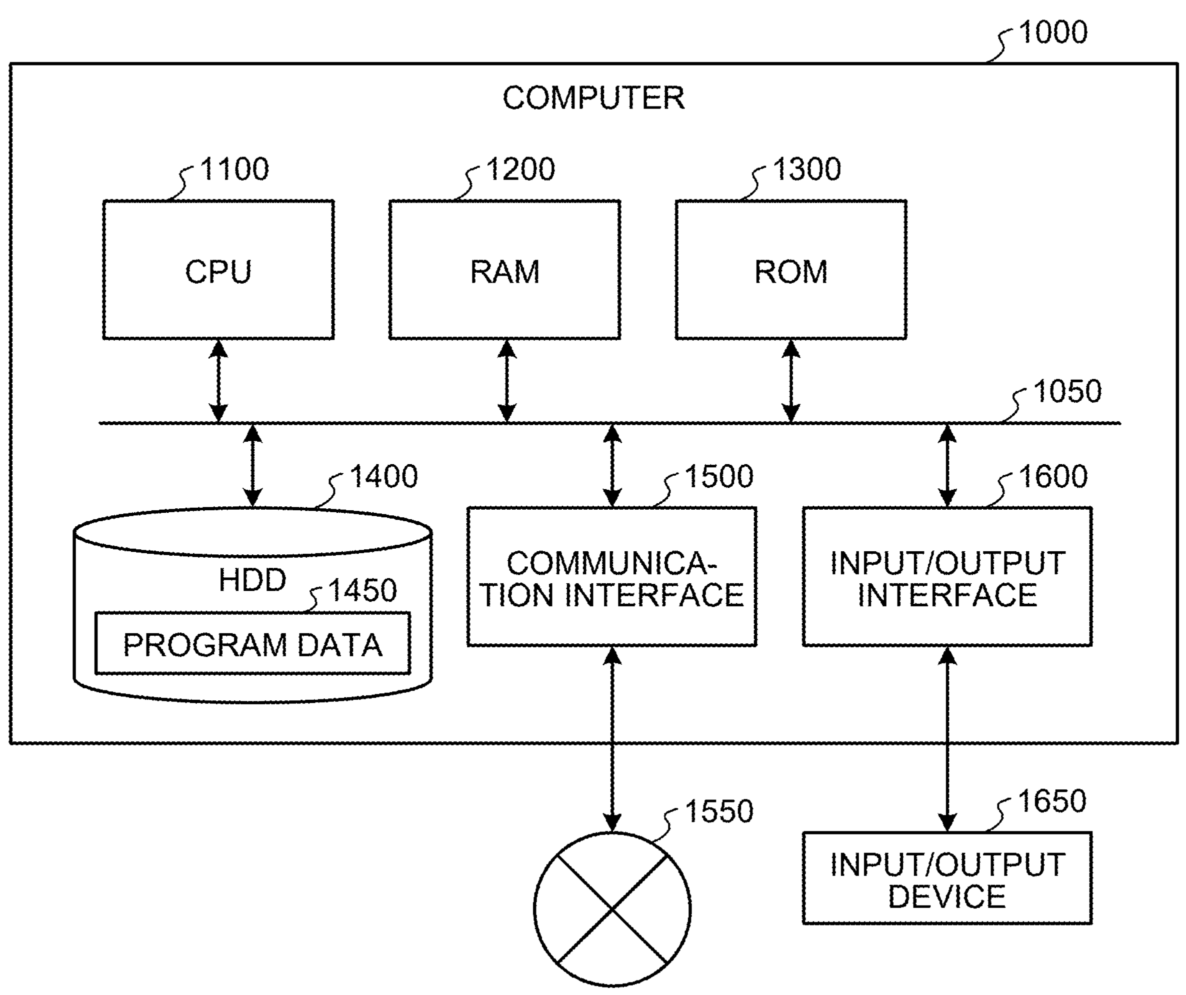
FIG. 13 is a hardware configuration diagram illustrating an example of a computer that realizes functions of an imaging apparatus.

The information device such as the imaging apparatus 100 according to each embodiment described above is realized by, for example, a computer 1000 having a configuration as illustrated in FIG. 13. Hereinafter, the imaging apparatus 100 according to the present disclosure will be described as an example. FIG. 13 is a hardware configuration diagram illustrating an example of the computer 1000 that realizes functions of the imaging apparatus 100. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates based on a program stored in the ROM 1300 or the HDD 1400 and controls each unit. For example, the CPU 1100 develops a program stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure as an example of a program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 also transmits data to an output device such as a display, an edge, or a printer via the input/output interface 1600. The input/output interface 1600 may function as a media interface that reads a program or the like recorded in a predetermined recording medium. Examples of the medium include an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the imaging apparatus 100 according to an embodiment, the CPU 1100 of the computer 1000 realizes the functions of the control unit 130 and the like by executing the information processing program loaded on the RAM 1200. The HDD 1400 stores an information processing program according to the present disclosure and data in the storage unit 120. The CPU 1100 reads the program data 1450 from the HDD 1400 and executes the program data, but as another example, these programs may be acquired from another device via the external network 1550.

The present technology may also take the following configurations.

(1) An information processing apparatus comprising:

an acquisition unit that acquires a first image through imaging;

a determination unit that determines whether a predetermined object is included in the first image acquired by the acquisition unit based on a model that has learned the predetermined object; and a selection unit that selects a second image from among images determined by the determination unit as including the predetermined object, and executes relearning of the model by using the selected second image.

(2) The information processing apparatus according to (1), wherein the determination unit determines whether the predetermined object is included in the first image by varying a threshold that is a degree indicating ease of recognition of the predetermined object by the model, and the selection unit selects the second image by using a second threshold different from a first threshold, the first threshold being a threshold that is used when the determination unit determines whether the predetermined object is included in the first image.

(3) The information processing apparatus according to (2), wherein the selection unit selects the second image by setting, as the second threshold, a value with which a degree of recognizing the predetermined object is increased as compared with the first threshold.

(4) The information processing apparatus according to any one of (1) to (3), wherein the determination unit determines whether a plurality of different objects are included in the first image based on a model that recognizes the plurality of different objects as the predetermined object, and the selection unit selects the second image from among the images determined by the determination unit as including the plurality of different objects, and executes relearning of the model using the selected second image.

(5) The information processing apparatus according to (4), wherein the determination unit determines whether the plurality of different objects are included in the first image by varying a threshold that is a degree indicating ease of recognition of the predetermined object by the model, the threshold being able to be set to a different value for each of the plurality of different objects.

(6) The information processing apparatus according to any one of (1) to (5), wherein the selection unit assigns a label used for learning to the second image based on the predetermined object included in the second image, and executes relearning of the model.

(7) The information processing apparatus according to (6), wherein the selection unit assigns the label to the second image by receiving designation of the label to be assigned to the predetermined object included in the second image via a user interface.

(8) The information processing apparatus according to (6) or (7), wherein the selection unit assigns the label to the second image by using a label assignment model that determines the label to be assigned to the predetermined object included in the second image.

(9) The information processing apparatus according to any one of (1) to (8), wherein the selection unit selects, as the second image, a plurality of images in which a camera parameter of the images are designated from among the images determined as including the predetermined object by the determination unit.

(10) The information processing apparatus according to (9), wherein the selection unit selects, as the second image, an image in which at least one parameter of an exposure value, white balance, and a gain is designated as the camera parameter.

(11) The information processing apparatus according to any one of (1) to (10), wherein the selection unit selects, as the second image, a plurality of images in which a size or an aspect ratio of the images is designated from among the images determined as including the predetermined object by the determination unit.

(12) The information processing apparatus according to any one of (1) to (11), wherein the acquisition unit acquires a predetermined number of a plurality of images having any one of the same camera parameter, image size, or aspect ratio at imaging, and the selection unit selects, as the second image, the plurality of images acquired by the acquisition unit.

(13) The information processing apparatus according to any one of (1) to (12), wherein the acquisition unit acquires images captured by a plurality of imaging devices installed at different positions as the first image, the determination unit determines, based on the model, whether the predetermined object is included in images captured by the plurality of imaging devices installed at different positions, and the selection unit selects, as the second image, a plurality of images including images captured by at least two different imaging devices from among the images determined as including the predetermined object by the determination unit, and executes relearning of the model by using the selected second image.

(14) An information processing method comprising:

causing a computer to acquire a first image through imaging;

causing the computer to determine whether a predetermined object is included in the acquired first image based on a model that has learned the predetermined object; and causing the computer to select a second image from among images determined as including the predetermined object and to execute relearning of the model by using the selected second image.

(15) A computer-readable storage medium storing an information processing program when executed causing a computer to function as:

an acquisition unit that acquires a first image through imaging;

a determination unit that determines whether a predetermined object is included in the first image acquired by the acquisition unit based on a model that has learned the predetermined object; and a selection unit that selects a second image from among images determined by the determination unit as including the predetermined object, and executes relearning of the model by using the selected second image.

REFERENCE SIGNS LIST

1 RELEARNING SYSTEM
10 IMAGE SET
100 IMAGING APPARATUS
110 COMMUNICATION UNIT
120 STORAGE UNIT
121 CAPTURED DATA STORAGE UNIT
122 MODEL STORAGE UNIT
130 CONTROL UNIT
131 ACQUISITION UNIT
132 DETERMINATION UNIT
133 SELECTION UNIT
134 TRANSMISSION UNIT
200 CLOUD SERVER

The invention claimed is:

1. An information processing apparatus comprising:

a camera configured to continuously capture a plurality of first images at an installation location; and circuitry configured to:

determine whether a predetermined object is included in each of the plurality of first images based on a model that has learned the predetermined object by comparing a recognition degree with a first threshold;

identify a subset of images from the plurality of first images as candidates for relearning based on the determination;

select a second image from among the candidate images by using a second threshold different from the first threshold, the second threshold being a value defining a specific range of recognition degrees with which the recognition degree indicating ease of recognition of the predetermined object is increased as compared with the first threshold; and execute relearning of the model by using the selected second image.

2. The information processing apparatus according to claim 1, wherein the circuitry is further configured to unit determines whether the predetermined object is included in the first image identify the subset of candidate images by varying the second threshold within the specific range of recognition degrees.

3. The information processing apparatus according to claim 1, wherein the circuitry is configured to determine whether a plurality of different objects are included in the first image based on a model that recognizes the plurality of different objects as the predetermined object, and select the second image from among the images as including the plurality of different objects, and execute relearning of the model using the selected second image.

4. The information processing apparatus according to claim 3, wherein the circuitry is configured to determine whether the plurality of different objects are included in the first image by setting the second threshold to a different value for each of the plurality of different objects.

5. The information processing apparatus according to claim 1, wherein the circuitry is configured to assign a label used for learning to the second image based on the predetermined object included in the second image, and execute relearning of the model.

6. The information processing apparatus according to claim 5, wherein the circuitry is configured to assign the label to the second image by receiving designation of the label to be assigned to the predetermined object included in the second image via a user interface.

7. The information processing apparatus according to claim 5, wherein the circuitry is configured to assign the label to the second image by using a label assignment model that determines the label to be assigned to the predetermined object included in the second image.

8. The information processing apparatus according to claim 1, wherein the circuitry is configured to select, as the second image, a plurality of images in which a camera parameter of the images are designated from among the subset of images determined as including the predetermined object.

9. The information processing apparatus according to claim 8, wherein the circuitry is configured to select, as the second image, an image in which at least one parameter of an exposure value, white balance, and a gain is designated as the camera parameter.

10. The information processing apparatus according to claim 1, wherein the circuitry is configured to select, as the second image, a plurality of images in which a size or an aspect ratio of the images is designated from among the images determined as including the predetermined object.

11. The information processing apparatus according to claim 1, wherein the circuitry is further configured to select, as the second image a plurality of images having any one of the same camera parameter, image size, or aspect ratio at imaging.

12. The information processing apparatus according to claim 1, wherein the images are captured by a plurality of imaging devices installed at different positions as the first image, the circuitry is configured to determine, based on the model, whether the predetermined object is included in images captured by the plurality of imaging devices installed at different positions, identify the subset of candidate images to include images captured by at least two different imaging devices, and select the second image from the subset execute relearning of the model by using the selected second image.

13. The information processing apparatus according to claim 1, wherein the circuitry is further configured to transmit the selected second image to an external server as an image set, and wherein the relearning of the model is performed by the external server using the transmitted image set.

14. The information processing apparatus according to claim 13, wherein the circuitry is further configured to receive a relearned model from the external server after the relearning, and to update the model stored in the apparatus with the received relearned model.

15. The information processing apparatus according to claim 14, wherein the circuitry is further configured to compare a recognition accuracy of the received relearned model with a recognition accuracy of a pre-trained model, and to selectively use one of the relearned model and the pre-trained model having a higher recognition accuracy for subsequent determination of whether the predetermined object is included in the first images.

16. The information processing apparatus according to claim 1, wherein the circuitry is further configured to initiate the relearning of the model in response to at least one of: a count of accumulated candidate images reaching a predetermined number, receipt of a relearning request from an administrator, or expiration of a predetermined time period from installation of the apparatus.

17. The information processing apparatus according to claim 1, wherein the camera is configured to continuously perform sensing within a viewing angle under low power consumption and to perform imaging and store one of the plurality of first images in response to recognizing the predetermined object in the viewing angle.

18. The information processing apparatus according to claim 1, wherein the model is a posture recognition model that has learned to recognize feature points of a human skeleton indicating a specific posture of a person, and wherein determination of whether the predetermined object is included in each of the plurality of first images includes determining whether point cloud data indicating the specific posture is present in the image.

19. An information processing method comprising:

continuously capturing a plurality of first images at an installation location;

determining whether a predetermined object is included in each of the plurality of first images based on a model that has learned the predetermined object by comparing a recognition degree with a first threshold;

identifying a subset of images from the plurality of first images as candidates for relearning based on the determination; and selecting a second image from among the candidate images by using a second threshold different from the first threshold, the second threshold being a value defining a specific range of recognition degrees with which the recognition degree indicating ease of recognition of the predetermined object is increased as compared with the first threshold; and executing relearning of the model by using the selected second image.

20. A non-transitory computer-readable storage medium storing an information processing program when executed causing a computer to:

receive a plurality of first images continuously captured at an installation location;

determine whether a predetermined object is included in each of the plurality of first based on a model that has learned the predetermined object by comparing a recognition degree with a first threshold;

identify a subset of images from the plurality of first images as candidates for relearning based on the determination; and select a second image from among the candidate images by using a second threshold different from the first threshold, the second threshold being a value defining a specific range of recognition degrees with which the recognition degree indicating ease of recognition of the predetermined object is increased as compared with the first threshold, and execute relearning of the model by using the selected second image.

* * * * *